(No Model.) 4 Sheets—Sheet 1.

W. S. BELDING.
COMMUTATOR FOR DYNAMOS.

No. 433,393. Patented July 29, 1890.

Witnesses:
Robert Ryan
Frank L. Stevens

Inventor:
Warren S. Belding
by Cyrus Kehr
Atty.

(No Model.) 4 Sheets—Sheet 2.

W. S. BELDING.
COMMUTATOR FOR DYNAMOS.

No. 433,393. Patented July 29, 1890.

Witnesses: Robert Ryan, Frank L. Johns.

Inventor: Warren S. Belding
by Cyrus Kehr
Atty.

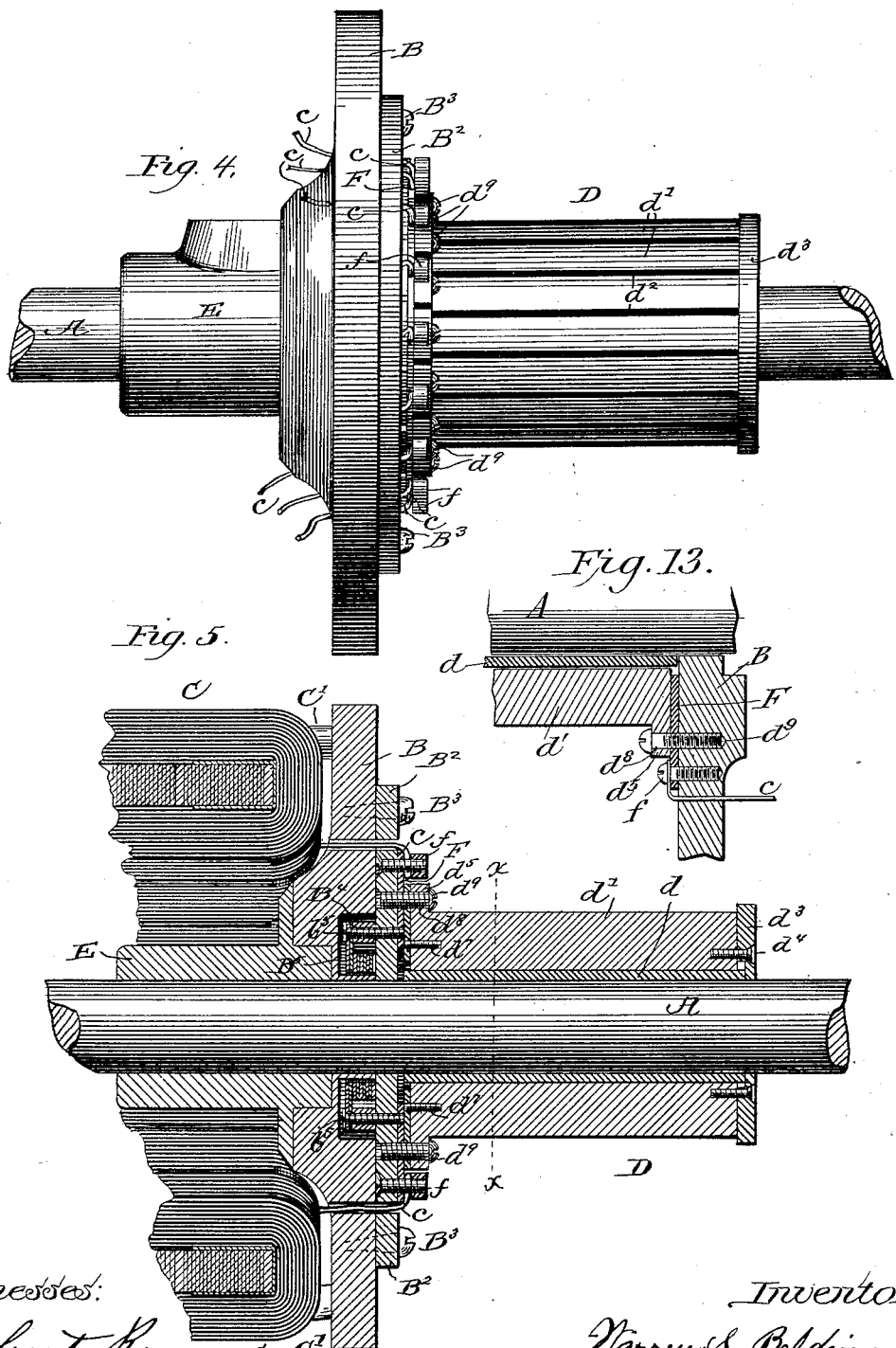

(No Model.) 4 Sheets—Sheet 4.
W. S. BELDING.
COMMUTATOR FOR DYNAMOS.
No. 433,393. Patented July 29, 1890.
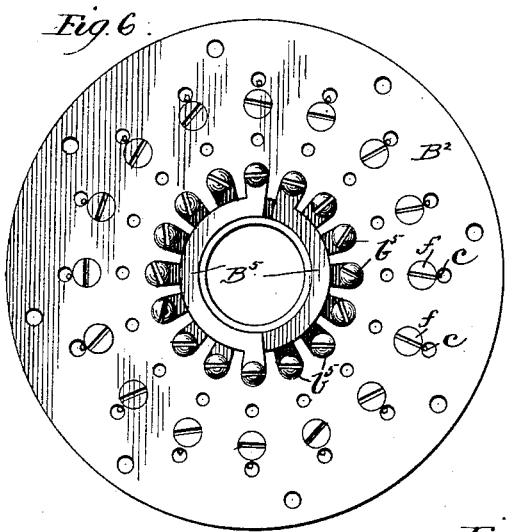
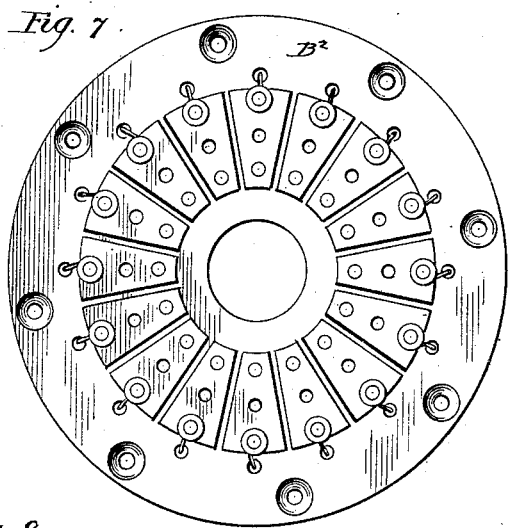
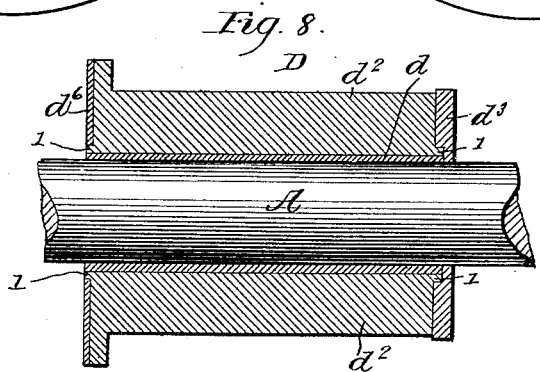
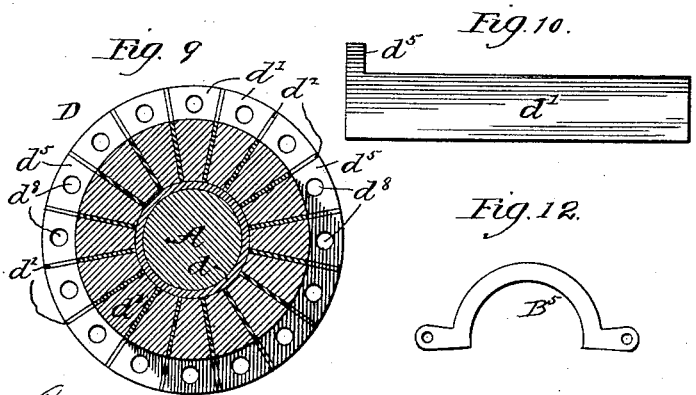
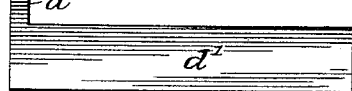
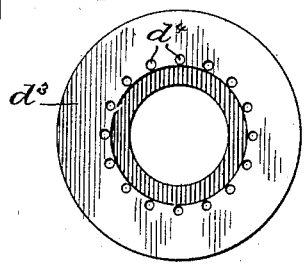
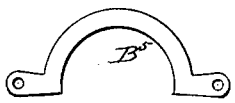
Witnesses:
Robert Ryan
Frank L. Stearns.
Inventor:
Warren S. Belding
by Cyrus Kehr
Atty

UNITED STATES PATENT OFFICE.

WARREN S. BELDING, OF CHICAGO, ILLINOIS.

COMMUTATOR FOR DYNAMOS.

SPECIFICATION forming part of Letters Patent No. 433,393, dated July 29, 1890.

Application filed January 30, 1890. Serial No. 338,590. (No model.)

*To all whom it may concern:*

Be it known that I, WARREN S. BELDING, a citizen of the United States, residing at Chicago, in the county of Cook and State of Illinois, have invented certain new and useful Improvements in Electric Motors and Dynamos; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to improvements in the spiders and commutators of armatures for electric machines, the object being to provide a commutator which may be readily detached and replaced without disturbing the wire-connections of the armature-coils; to connect the armature-coils electrically into pairs by connections which are not disturbed by the removal of the commutator, and which connections are fully sealed away from air, dust, and moisture; to effect such an arrangement of the parts of the commutator and its connections as to render said parts capable of being readily removed and replaced by new parts.

Figure 1:
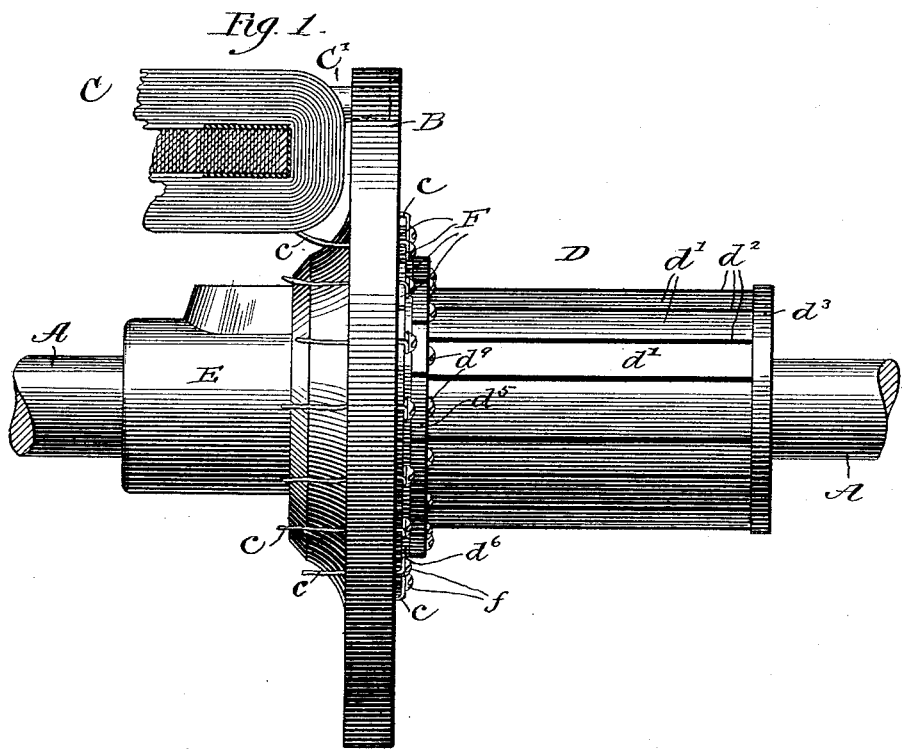
Figure 3:
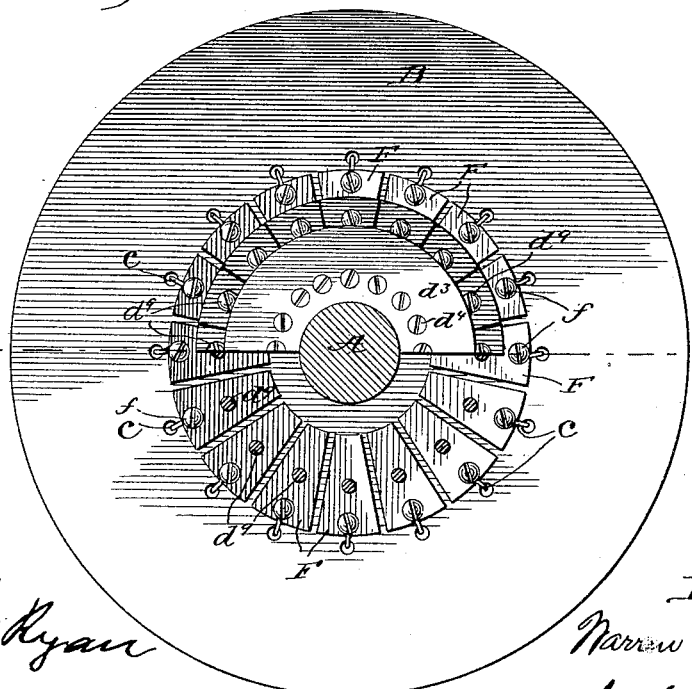
Figure 2:
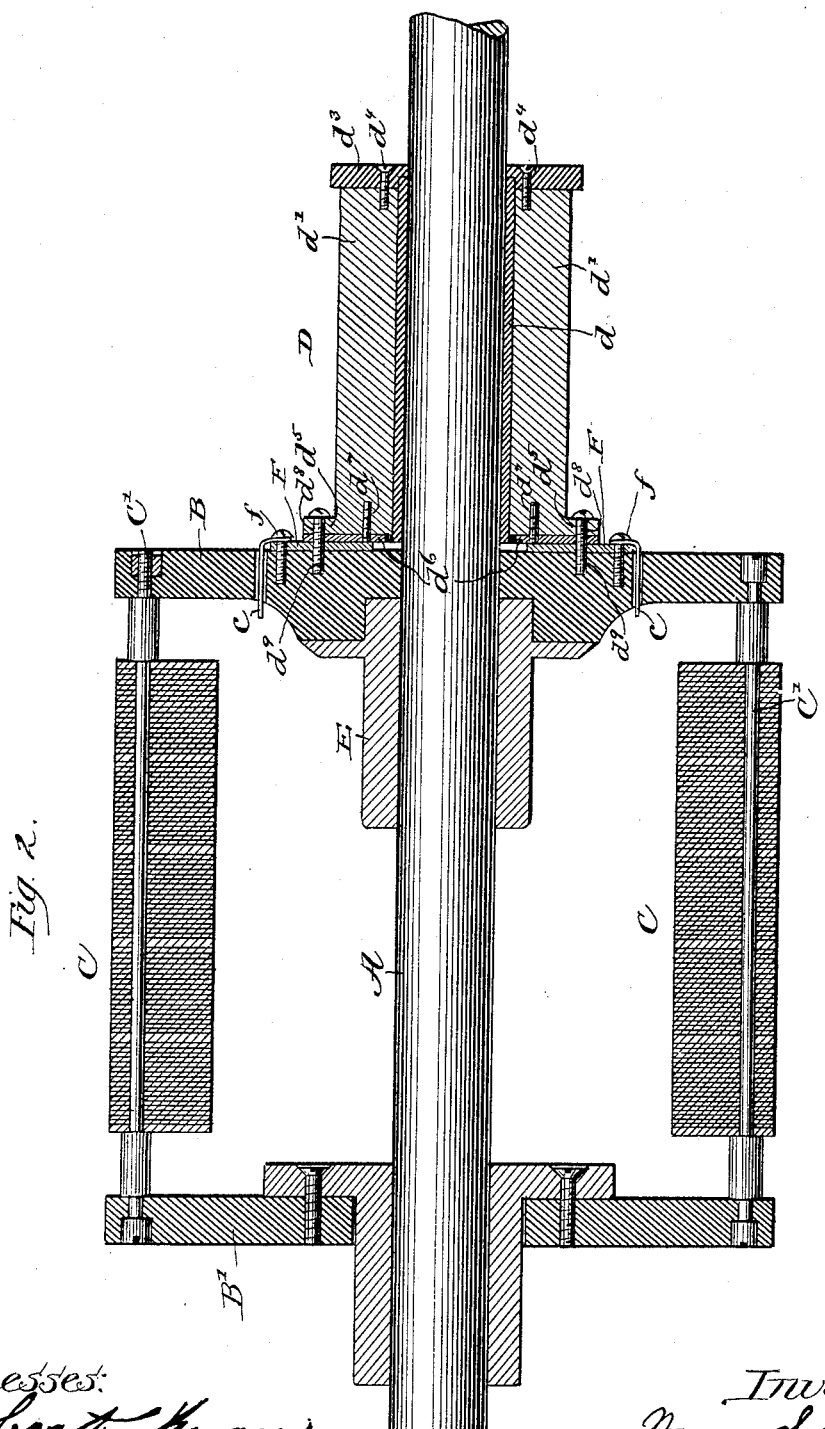

In the accompanying drawings, Figure 1 is a side elevation showing a spider and commutator to be used in an armature in which the armature-coils are not connected electrically into pairs, as is the case in Figs. 4 and 5. Fig. 2 is a longitudinal section of the form shown in Fig. 1, the entire armature being shown. Fig. 3 is a half sectional end view of the armature shown in Fig. 2. Fig. 4 is a side view of a commutator and spider in which provision is made for connecting the armature-coils into pairs. Fig. 5 is a longitudinal section of an armature in which the coils are connected in pairs. Fig. 6 is a view of the inner side of the disk inclosing the coil-connections. Fig. 7 is an outer view of the same disk. Fig. 8 is a longitudinal section of the commutator. Fig. 9 is a section of the commutator taken in line $x\,x$ of Fig. 5. Fig. 10 is a detached view of one of the commutator-plates. Fig. 11 is an elevation of the outer end of the commutator. Fig. 12 is a detached view of one of the pairing-strips used in connecting the armature-coils into pairs. Fig. 13 is a detail showing a commutator-plate in contact with the keystone-plate.

Referring first to Figs. 1, 2, and 3, A is the shaft of the armature. B is the spider adjacent to the commutator. B' is the opposite spider. C C are the coils of the armature, and D is the commutator. The spider B, or at least the central portion thereof, is in disk form and is composed of insulation material. Bolts C' extend through the armature-ring and the spiders to support the ring.

In the drawings, the spider B is shown as a single disk of insulation material extending from the bolts C' to the shaft A, and the disk is shown as re-enforced by the metallic hub E, which surrounds the shaft A and is suitably secured to said disk. It will be observed that by this means the armature-coils are insulated from the spider B, and that said spider forms an insulation support for the connections to be hereinafter described.

A series of metallic plates F, preferably of keystone form, are applied flatwise to the outer face of the disk B in a circle concentric with the shaft A, the inner ends of said keystone-plates not quite reaching said shaft. Said keystone-plates are separated from each other and are placed equidistant and are the same in number as the coils of the armature. Said keystone-plates are secured to the spider B by means of screws $f$ and $d^9$ or otherwise. The wires $c$ from the coils C extend through the spider B beside the adjacent keystone-plates F, and the end of each such wire is bound to one of said pieces by means of the screw $f$, so that said plate is in electric communication with its coil. When all the coils of the armature have thus been connected with their keystone-plates, the armature is ready to receive the commutator. The commutator is built up of a number of pieces to constitute a single body, the periphery being divided into the usual separated commutator-plates. In applying the commutator to the spider it is only necessary to place each commutator-plate into electric connection with one of the keystone-plates F.

The commutator shown in Figs. 1, 2, 4, 5, and 9 is made as follows: An insulation-sleeve $d$ surrounds the shaft. Surrounding this sleeve are the commutator-plates $d'$, separated by insulation strips $d^2$. Surrounding the shaft and lying over the outer ends of the commutator-plates in a ring $d^3$ of insulation material, and through said ring and into the commutator-plates extend screws $d^4$, which bind said ring to said plates and secure the outer ends of said plates. The inner ends of said commutator-plates have the radial extensions $d^5$. Extending around the sleeve $d$ and over the inner ends of the commutator-plates is a ring $d^6$ of insulation material, secured to said commutator-plates by pins $d^7$ or otherwise. A hole $d^8$ extends through each extension $d^5$ and the adjacent portion of the ring $d^6$. The commutator thus constituted is applied around the shaft and against the spider B, so that a commutator-plate $d'$ shall stand opposite each keystone-plate F, and a screw $d^9$ is then driven through each hole $d^8$ and the radial extension $d^5$ and the adjacent keystone-plate F, electric connection being thus established between said commutator-plate and the adjacent keystone-plate, and through the latter with the corresponding coil of the armature. Thus the commutator is well secured to the spider, and at the same time electric connection is established between all the commutator-plates and their respective armature-coils. It will be observed that with this construction the commutator may be removed for repairs and other purposes by simply withdrawing the screws $d^9$, the keystone-plates and the wires from the armature-coils being undisturbed.

A preferred way of securing the insulation strips $d^2$ is illustrated in Fig. 8. Said figure is a longitudinal central section of the commutator, exposing said insulation-strips. As shown by said figure, the body of said strip is of the same form as the commutator-plate $d'$, and has at each corner nearest the shaft A a short extension $l$, extending into the adjacent insulation-ring $d^3$ or $d^6$. It is to be observed that when the conductivity of the screw $d^9$ is insufficient to carry the desired current a portion of the commutator-plates D may be brought directly into contact with the keystone-plates, so that the current may pass directly from said commutator-plates to said keystone-plates.

The manner of joining the armature-coils into pairs will now be explained by reference to Figs. 4, 5, 6, 7, and 12. This feature is intended to be applied to quadrupolar or multipolar machines. The commutator may be the same as already described and applied to the keystone-plates in the manner already described; but said keystone-plates, instead of being mounted directly upon the spider B, are mounted upon a subordinate disk $B^2$, which disk surrounds the shaft A and is concentric therewith, and is applied flatwise to the spider B and secured thereto by means of screws $B^3$. An annular space $B^4$ is formed in the outer face of the spider B, and the disk $B^2$ extends over said space and makes it a closed chamber. Before the disk $B^2$ is secured to the spider B a semicircular pairing-strip $B^5$ is laid flatwise upon said disk $B^2$, with its ends opposite two keystone-plates to be connected electrically with opposite armature-cores, and screws $b^5$ are extended through said ends of said pairing-strip into said keystone-plates. Thus said pairing-strip connects the keystone-blocks, and through the latter the opposite armature-core. Said pairing-strip is curved to conform to the annular chamber $B^4$. Another pairing-strip similar to the first is so applied over the first, but insulated therefrom in such position as to bring its ends opposite another pair of keystone-plates and screws $b^5$, extended through said ends and said keystone-plates. A third pairing-strip is applied in a similar way to another pair of keystone-plates, and so on until all the keystone-plates, and through the latter the armature-coils, are electrically connected into pairs. Then when all these pairs of plates have been thus applied and secured the disk $B^2$ is applied to the spider B, the mass of said pairing-strips extending into the annular space $B^4$. The wires $c$ extend through the spider B and through or around the edge of the disk $B^2$, and are secured by the screws $f$. This armature may then be operated by means of two brushes instead of four, as required by the other form already described. If, for example, one of the brushes is in contact with the upper commutator-plate, as shown in Fig. 5, said brush will be in electric communication with the upper coil C through the adjacent keystone-plate and is at the same time in electric connection with the lower coil C through the same keystone-plate, the adjacent screw $b^5$, the pairing-strip $B^5$, the opposite screw $b^5$, and the opposite keystone-plate F. When the armature has made a half-rotation, the opposite commutator-plate will be in contact with the brush and the latter will be in electric communication with the same electric coils, the channel for the circuit being through the lower keystone-plate in the drawings to what is the lower coil in the drawings, and through said plate, the lower screw $b^5$, the pairing-strip $B^5$, the upper screw $b^5$, and the upper keystone-plate F.

Opposite armature-coils have heretofore been joined electrically into pairs by other means, and I do not claim the same, broadly.

I claim as my invention—

1. In an electric motor or dynamo, a shaft, an insulation-spider mounted upon said shaft, an armature-ring supported at one end by said spider, a series of keystone-plates arranged upon the face of said spider around said shaft, each such keystone-plate being connected electrically with a coil of the armature, and a commutator surrounding said shaft and having one end resting near or against said keystone-plates and having each commutator-plate connected electrically with a keystone-plate, substantially as shown and described.

2. In an electric motor or dynamo, a shaft, an insulation-spider surrounding said shaft, and an armature-ring supported at one end by said spider, a series of keystone-plates applied to the face of said spider and surrounding said shaft, a commutator surrounding said shaft and having its end resting against or near said spider, said commutator having plates with radial extensions $d^5$ at the ends adjacent to said spider, and screws $d^6$, extending through said radial extensions and said keystone-plates, substantially as shown and described.

3. In an electric motor or dynamo, a shaft, an insulation-spider surrounding said shaft, and an armature-ring supported at one end by said spider, keystone-plates secured to said spider or some part supported thereby by screws, the wire of said coils extending through said spider and being secured by one of said screws in electric communication with said keystone-plates, a commutator surrounding said shaft and having insulation-plates with radial extensions at the ends adjacent to said spider, and screws extending through said radial extensions and said keystone-plates, substantially as shown and described.

4. In an electric motor or dynamo, a shaft, a spider surrounding said shaft, an insulation-disk also surrounding said shaft and applied to the outer face of said spider, a sealed annular space being formed between said disk and spider, a commutator surrounding said shaft having its inner end resting against or near said disk and having the inner ends of its plates in electric communication with the wires of the armature-coils, and a series of pairing-strips located within said annular channel and having their ends connected electrically with the commutator-plates, substantially as shown and described.

5. In an electric motor or dynamo, a shaft, a spider surrounding said shaft, said spider being composed of insulation material and having in its outer face an annular channel, an insulation-disk applied around said shaft and against the outer face of said spider over said annular channel, a series of keystone-plates applied to the outer face of said disk and secured thereto by screws, the wire of each armature-coil being secured in electric communication with one of said keystone-plates, a series of pairing-strips arranged within said annular channel and joined by screws to opposite keystone-plates, and a commutator surrounding said shaft and secured to the armature by means of a screw passing through each commutator-plate into one of the keystone-plates, said commutator being thus made removable by the withdrawal of the last-mentioned screws, substantially as shown and described.

6. In an electric motor or dynamo, a spider surrounding said shaft, an armature-ring supported at one end of said spider, a series of keystone-plates supported by said spider and insulated from said shaft and armature, a series of pairing-strips connected electrically with opposite keystone-plates, and a commutator surrounding said shaft and joined detachably to said spider, with its commutator-plates in electric communication with said keystone-plates, substantially as shown and described.

7. In an electric motor or dynamo, a shaft, a spider surrounding said shaft, and an armature-ring supported at one end by said spider, an insulation-disk applied to the outer face of said spider, a series of keystone-plates supported upon said insulation-disk and joined electrically into pairs by pairing-strips arranged in a space between said spider and said disk, the wire of the armature-coils being secured in communication with said keystone-plates, and a commutator surrounding said shaft and having the inner end of each of its plates held in electric communication with one of said keystone-plates, substantially as shown and described.

In testimony whereof I affix my signature, in presence of two witnesses, this 30th day of October, 1889.

WARREN S. BELDING.

Witnesses:
CYRUS KEHR,
AMBROSE RISDON.